Sept. 13, 1932.   R. L. CARR   1,876,855
VEHICLE BODY
Filed Sept. 11, 1931    2 Sheets-Sheet 1
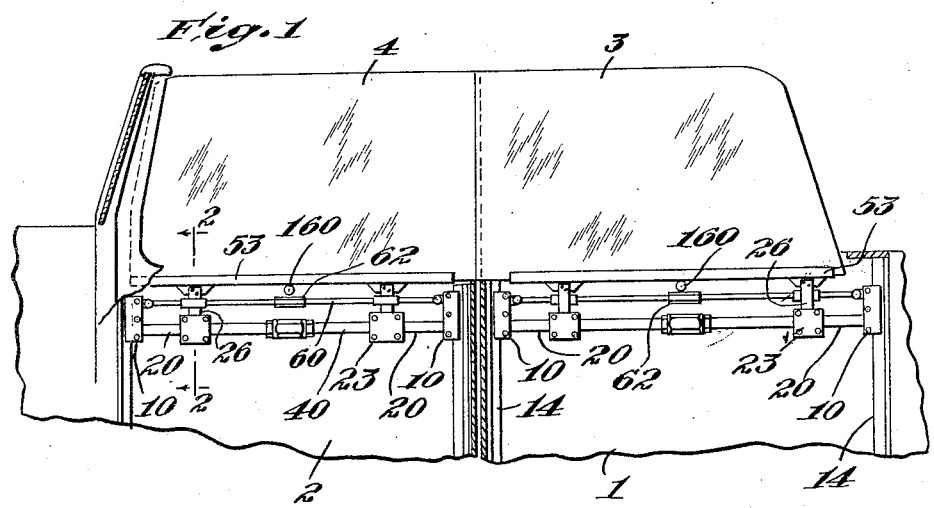
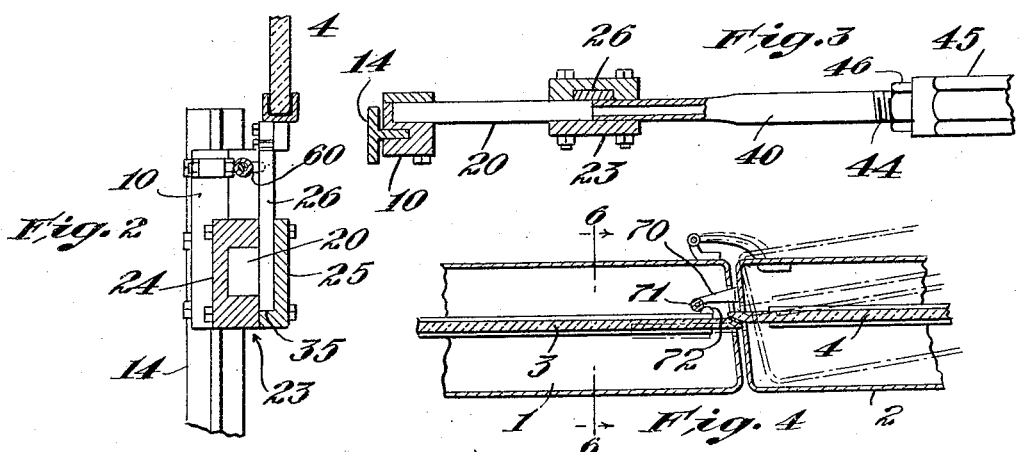
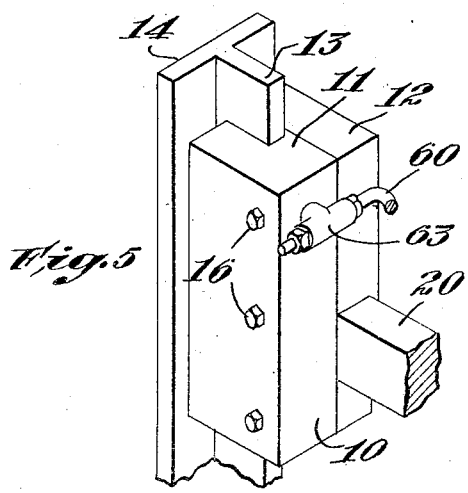
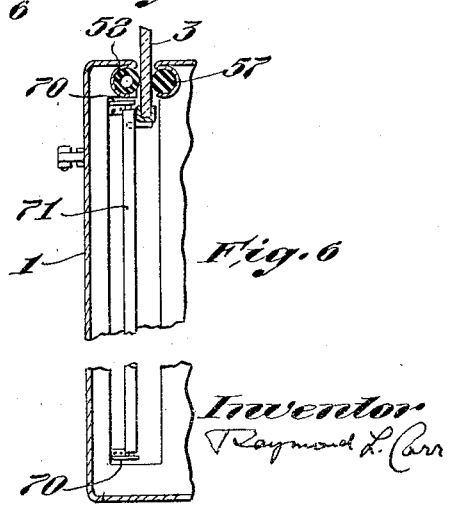
Inventor
Raymond L. Carr

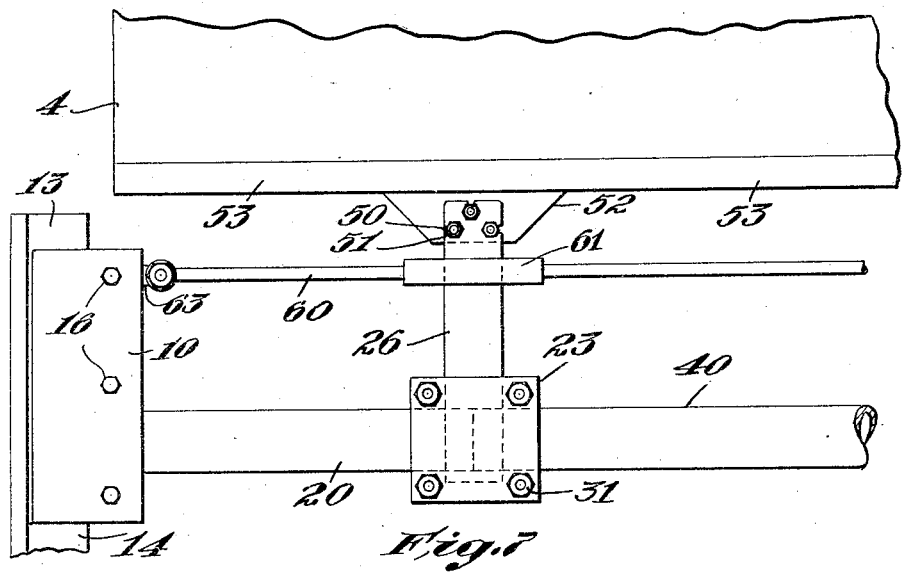
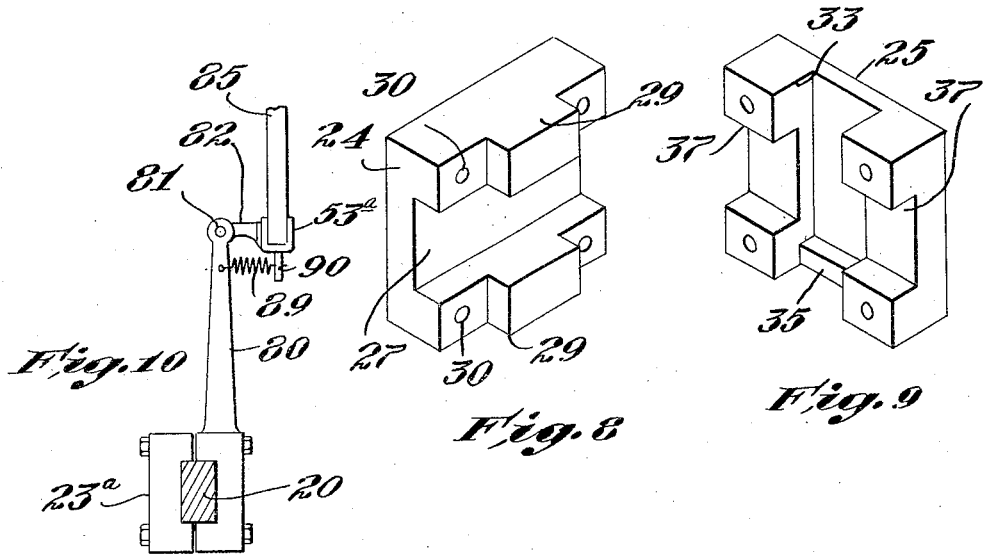
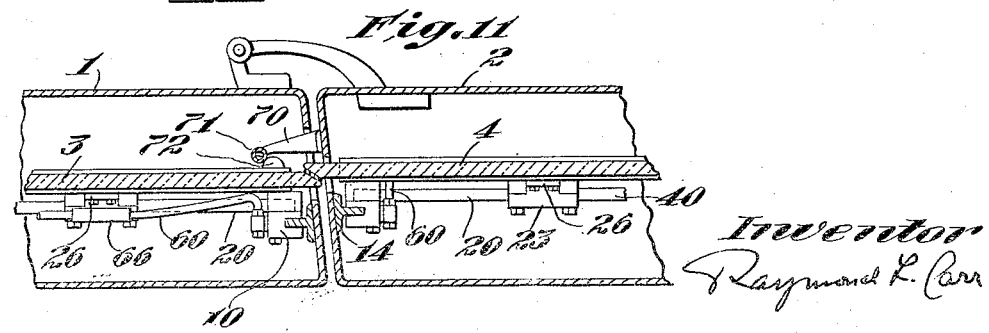

Patented Sept. 13, 1932

1,876,855

UNITED STATES PATENT OFFICE

RAYMOND L. CARR, OF BOSTON, MASSACHUSETTS

VEHICLE BODY

Application filed September 11, 1931. Serial No. 562,284.

This invention relates to an improved vehicle body, and in some aspects comprises a further development of the arrangements shown in my copending applications Serial No. 183,199, filed April 12, 1927, and Serial No. 371,162, filed June 15, 1929, now Patents No. 1,826,922 and 1,926,865, respectively. The above-identified copending applications each disclose a vehicle body provided with closure panels movable out of a concealed position within the body wall to a raised position thereabove to provide a continuous closure wall without necessitating independently movable panel sections or separate posts between the panels or the like. More particularly, resilient means are provided to press the panel edges against each other to hold the panels together despite body weaving and twisting. The present invention provides an improved arrangement of resilient means and adjuncts therefor for properly positioning and supporting the panels and holding their edges in engagement. This invention also provides improved relatively simple means for assuring proper reengagement of the panel edges when the panels have been separated due to door opening.

In accordance with this invention, torsion spring means may be spaced from the lower parts of the panels to swing the entire panel as a unit about a substantially horizontal axis. Thus the center of movement of the panel is disposed substantially below the lower edge of the panel. Yieldable means is provided between the torsion spring means and the lower edge of the panel to permit proper positioning of the entire panel edge in engagement with the edge of an adjoining panel. This arrangement is particularly advantageous in permitting the employment of a stop element to limit the movement of the panel under the action of the spring means so that the latter may be maintained in a stressed condition under all conditions, for example, even when the door has been opened. Accordingly, when the door is closed, the panel edges are pressed together with appreciable pressure, although only slight movement of the panels in relation to their respective body wall sections may take place as the spring means is disengaged from the stop elements.

A further aspect of the invention relates to the structural arrangement of the torsional spring elements and strut means cooperating therewith to hold shoes which move with the panels in engagement with guides adjoining the ends of the panels.

In the accompanying drawings:

Fig. 1 is a side elevation of a vehicle body wall with its inner facing removed, more clearly to illustrate the arrangement of the panel supporting means;

Fig. 2 is a section indicated by line 2—2 of Fig. 1;

Fig. 3 is a horizontal view, partly in section, showing the arrangement of the spring connections and related parts;

Fig. 4 is a view somewhat diagrammatic in character, showing the improved arrangement for stressing the spring supports for one of the panels when the door is moving toward its closed position;

Fig. 5 is a perspective view of a portion of the panel supporting assembly;

Fig. 6 is a broken vertical section indicated by line 6—6 of Fig. 4;

Fig. 7 is an elevational view of one end of a panel on a larger scale than Fig. 1;

Figs. 8 and 9 are perspective views of the clamping means for connecting the spring elements of the panel supports to each other;

Fig. 10 is a sectional detail illustrating an optional form of the invention; and Fig. 11 is a horizontal section of the body wall, the panels being shown in their lowered positions.

The accompanying drawings illustrate a vehicle body having panels of the general type and movable in the same manner as those shown in my copending application Serial No. 371,162, which is incorporated herein by reference. A top of the type shown in that application may be employed with panels supported in accordance with this invention. As shown in Fig. 1, a vehicle body constructed in accordance with this invention may have a rear body wall section 1 which may be stationary and a swinging door section 2 which is hinged to the rear section. Closure panels 3 and 4 may be carried by body wall sections 1 and 2 respectively and may conveniently be provided with glass body portions having beveled edges which normally slide in engagement with each other. If desired, one of these edges may be provided with a transparent cellulosic strip cementitiously secured thereto, such as is fully described in said copending applications. Each of the panels is independently movable from a concealed position within the body wall to a raised position thereabove, the ends of the body wall sections being provided with slots to permit the panel edges to remain in engagement throughout their path. Thus even if one panel is raised and the other is lowered, the lower portion of the edge of the first panel will be engaged by the upper portion of the edge of the second panel. Any suitable lifters, which may be of conventional type, may be provided for moving the panels, the rollers 160 (Fig. 1) being the parts of the lifters that engage the panels.

Preferably I provide substantially vertical guides 14 which may conveniently be of T-section, as shown in Fig. 5, at the ends of the body wall sections, these guides having outstanding flanges 13 which engage grooves in similar shoes 10. Each of the latter may comprise two metal blocks 11 and 12 clamped together by bolts 16 and cooperating to provide a recess in which the end of a torsion spring 20 is received. Preferably this torsion spring may be non-circular or rectangular in cross section and may project in a substantially horizontal direction from the guide shoe.

The outer end of each torsion spring is received in a clamp 23, the details of which are more particularly illustrated in Figs. 7, 8 and 9. This clamp preferably is formed of two metal portions 24 and 25 which cooperate in providing a horizontal recess to receive the end of the torsion spring 20 and provide a vertical recess to receive an upstanding leaf spring 26. Thus the block 24 may have a continuous horizontal groove 27 therein of rectangular cross section, as shown in Fig. 8. Outstanding protuberances 29 may be disposed at either side of this groove, and openings 30 are provided at each side of the protuberances 29 for the reception of the clamping bolts 31. The member 25 may be provided with a vertical groove 33 to receive the protuberances 29 in interfitting engagement therewith and to provide a space between the faces of these protuberances and the inner face of the groove 33 for the reception of the spring 26, see Fig. 3. An outwardly projecting flange 35 is located at the bottom of the group 33 to engage the bottom of the spring 26. At each side of the groove 33 are horizontal grooves 37 corresponding to the groove 27 of the member 24. One of these grooves is adapted to cooperate with a portion of the groove 27 in providing a recess of rectangular cross section in which the outer end of a torsion spring 20 is clamped. A strut element 40, preferably of hollow or tubular form, has a rectangular end mounted in the opposite end of the recess provided by grooves 27 and 37, the ends of the member 20 and strut element 40 preferably contacting each other, as indicated by dotted lines in Fig. 7.

The strut element 40 as it projects from the clamp 23 gradually merges into a cylindrical form and the end of this element is provided with threads 44 which engage an oppositely threaded expansion nut element 45 and lock nuts 46. When the parts are assembled and before the clamping bolts 31 are fully tightened, the nut 45 may be turned to cause the elements 40, which are in threaded engagement with its opposite ends, to move away from each other, thus pressing the springs 20 outwardly and holding the shoes 10 in firm engagement with the guides 14 despite distortion of the springs 20 and 26; thereafter the bolts 31 may be tightened. Thus the members 40 and 45 form an expansible strut between the ends of springs 20.

The upper end of each spring 26 is provided with inwardly extending notches or slots 50 (Fig. 7), which receive clamping bolts 51 connecting the upper end of the spring to a depending block 52 that is welded to a channel or holder 53 that receives the lower end of the corresponding glass body portion of the panel. The springs 20 and 26 are stressed to hold the panel edges in engagement when the door is closed. If desired, as shown in Fig. 6, suitable resilient rubber elements 57 and 58 may extend along the top of the body wall and engage the panels to assist in holding them in engagement.

A stop element 60 preferably is adjustably secured to each of the shoes 10. This stop element may comprise a bar having a portion substantially parallel to the springs 20 and normally spaced from the upper portion of a spring 26, as shown in Fig. 2, when the latter are stressed due to the engagement of the panel edges with each other. The bar 60 may have an inturned end portion with a threaded extremity that is clamped to an ear element 63 projecting from the shoe 10. The adjoining ends of bars 60 engage an expansion nut 62 under the center of each panel. The roller 160 of the lifting mechanism normally engages the channel 53, but when the panel is being lowered it may engage the nut positively to move the panel downwardly. Adjustment of the threaded inturned ends of the bars permits a variation in the positioning of their body portions in relation to the springs 26. Preferably the bars are provided with rubber sleeves 61 engageable by the springs 26.

It is thus evident that even when the springs are not stressed, as for example when the door is open and the panel edges are out of engagement, the torsion springs 20 and the springs 26 will tend to resume their unstressed shapes until the upper ends of springs 26 engage the rubber sleeves 61. Thus the movement of each panel, when the edges of the panels are disengaged, may be relatively slight, while only a slight movement of the panel edge from this position corresponding to a slight movement of the spring 26 out of engagement with the stop member may be sufficient to cause the springs to impose a considerable pressure upon the panel edges.

In order, however, positively to assure engagement of the panel edges when the door closes and to prevent objectionable clashing of the glass edges, I may provide special means operable to stress the springs supporting one of the panels just as the door closes. For this purpose reference may be had to Figs. 4, 6 and 11, from which it is evident that arms 70 project from the end of door 2 into the body section 1 and support a vertical roller 71. A protuberance 72 is engageable with this roller throughout the path of the panel 3 in such a manner that when the door is nearly in its closed position, the roller engages the protuberance 72 with a cam-like action, stressing the supporting springs and moving the panel 3 to the position indicated in dotted lines in Fig. 6. Thus the edge of panel 4 may properly reengage panel 3 despite the fact that the springs supporting the latter are not stressed to quite their normal shape. The arrangement of the stop means, however, with the supporting springs of each of the panels only makes it necessary to move the panel edge in this manner through a comparatively small distance. Thus simple means of the character disclosed herein may be depended upon for this purpose.

Fig. 10 illustrates a modified form of the invention. The clamping means 23ª may be of the same general type as has been described, but an upstanding arm 80 is fixed to one of the elements of this clamp, this arm being relatively rigid in contrast to the spring 26. A pivotal connection 81 at the upper end of the arm 80 joins the latter to a projection 82 that is fixed to the holder 53ª of the glass panel 85. A coil spring 89 is disposed between an ear 90 depending from the holder 53ª and the side of the upstanding arm 80. Thus the main torsion spring 20 may be effective to permit the swinging of the entire unit supported thereby about a substantially horizontal axis, while the pivotal connection of the panel with the arm 80 together with the spring 89 allows the panel to adjust itself to the position of the adjoining panel with which it is engaged so that the panel edges may engage each other throughout their heights. If the panel engaged by panel 85 is at the side opposite the arm 80, the spring 89 preferably may be an expansion spring which is stretched when the panels are in normal engagement. If the panel engaged by panel 85 is on the same side of the latter as the arm 80, the spring 89 preferably may be a compression spring.

It is evident that the present invention provides torsion spring means which is mainly intended to swing the entire body portion of the panel as a unit about a horizontal axis disposed below the body portion of the panel, while the auxiliary springs 26 or 89 are effective in permitting slight variation in the positioning of localized portions of the panel edges so that the edges properly engage each other throughout their heights. The provision of the stops 61 is especially advantageous, since they avoid objectionable movement of a panel with which they are associated, even should the adjoining panel be lowered while the first panel is raised or when the door is open. Accordingly in the latter case a simple arrangement of the type illustrated in Figs. 4 and 6 may be employed to assure proper meeting of the panel edges.

I claim:

1. A vehicle body comprising a hollow body wall, a pair of panels movable from a lowered position thereabove, a guide in the body wall, torsion spring means slidably associated with said guide, and an arm extending upwardly from said spring to the lower portion of the panel, said spring yieldably pressing one of the panel edges against that of the other panel.

2. A vehicle body comprising a hollow body wall, said wall including a door section and an adjoining section, a pair of panels carried respectively by said sections, positioning means for said panels including a torsion spring defining a substantially horizontal axis, one end of said spring being connected to the body wall, and an upwardly extending arm between the spring and lower portion of the panel, said spring pressing the edge of one of said panels against the edge of an adjoining panel.

3. A vehicle body comprising a hollow body wall, said wall including a door section and an adjoining section, a pair of panels carried respectively by said sections, positioning means for said panels including a torsion spring defining a substantially horizontal axis, one end of said spring being connected to the body wall, and an upwardly extending resilient arm between the spring and lower portion of the panel, said spring and arm pressing the edge of one of said panels against the edge of an adjoining panel.

4. A vehicle body comprising a hollow body wall, said wall including a door section and an adjoining section, a pair of panels carried respectively by said sections, positioning means for said panels including a torsion spring defining a substantially horizontal axis, one end of said spring being connected to the body wall, an upwardly extending arm between the spring and lower portion of the panel, said spring pressing the edge of one of said panels against the edge of an adjoining panel, and a secondary spring between the upper end of the arm and a part carried by the panel, whereby the panel edges are held together despite relative movement of the body wall sections.

5. A vehicle body comprising a hollow body wall, said wall including a door section and an adjoining section, a pair of panels carried respectively by said sections, positioning means for said panels including a torsion spring defining a substantially horizontal axis, one end of said spring being connected to the body wall, an upwardly extending arm between the spring and lower portion of the panel, said spring pressing the edge of one of said panels against the edge of an adjoining panel, a guide within the body wall, a shoe slidable on the guide and receiving the end of the spring, and a stop element projecting from the shoe and engageable with the arm below the panel, whereby the spring may be held under stress when the opening of the door moves the panel edges out of engagement.

6. A vehicle body comprising a hollow body wall, said wall including a door section and an adjoining section, a pair of panels carried respectively by said sections, positioning means for said panels incuding torsion springs below opposite ends of one panel, guides adjoining the ends of that panel, shoes slidable upon the guides and supporting the torsion springs, arms extending upwardly from the springs and connected to the lower portion of the panel, and a stop bar connecting the shoes and engageable with the arms to limit movement of the latter under the action of the springs.

7. A vehicle body comprising a hollow body wall, said wall including a door section and an adjoining section, a pair of panels carried respectively by said sections, positioning means for said panels including torsion springs below opposite ends of one panel, guides adjoining the ends of that panel, shoes slidable upon the guides and supporting the torsion springs, arms extending upwardly from the springs and connected to the lower portion of the panel, and an expansion strut disposed between the ends of the torsion springs.

8. A vehicle body comprising a hollow body wall, said wall including a door section and an adjoining section, a pair of panels carried respectively by said sections, positioning means for said panels including a resilient part associated with one panel and effective to press the edge of that panel transversely against the edge of the other panel and stop means within the body wall to limit the movement of the panel under the action of the resilient arm whereby the latter is always at least under a minimum stress.

9. A vehicle body comprising a hollow body wall, said wall including a door section and an adjoining section, a pair of panels carried respectively by said sections, positioning means for said panels including a resilient part associated with one panel and effective to press the edge of that panel transversely against the edge of the other panel, means operable to stress said part when the panel edges are out of engagement due to door opening, said last-named means including an element projecting from the end of one of said sections, and a part carried by the panel having a cam-like engagement with said element as the door section moves to its closed position.

10. A vehicle body comprising a hollow body wall, panels independently movable from a concealed position in the body wall to a raised position, positioning and supporting means for said panels, said means including an arm depending from the lower portion of the panel and movable therewith, and resilient means associated with the lower end of the arm and tending to swing the panel and arm about a substantially horizontal axis yieldably to press the panel edges together.

11. A vehicle body comprising a hollow body wall, panels independently movable from a concealed position in the body wall to a raised position, positioning and supporting means for said panels, said means including an arm depending from the lower portion of the panel and movable therewith, a resilient member associated with the lower end of the arm and tending to swing the panel and arm about a substantially horizontal axis yieldably to press the panel edges together, and a resilient element between the upper end of the arm and the panel, whereby the edge of the latter conforms to the position of the edge of the adjoining panel.

12. A vehicle body comprising a hollow body wall, panels independently movable from a concealed position in the body wall to a raised position, positioning and supporting means for said panels, said means including an arm depending from the lower portion of the panel and movable therewith, and resilient means associated with the lower end of the arm and tending to swing the panel and arm about a substantially horizontal axis yieldably to press the panel edges together, said arm also being resilient to aid in holding the panel edges in proper contacting relation.

13. A vehicle body comprising a body wall including a door section and an adjoining section, a pair of independently movable panels carried respectively by said sections, positioning means for said panels normally holding their edges in engagement, said means including a part moving with one panel and tending to tip it toward the other panel, and means moving with the panel and opposing the action of said part whereby the latter is stressed even when the panel edges are disengaged.

14. A vehicle body comprising a hollow body wall, panels independently movable from a concealed position in the body wall to a raised position, positioning and supporting means for said panels, said means including an arm depending from the lower portion of one panel and movable therewith, and resilient means associated with the lower end of the arm and tending to swing the panel and arm about a substantially horizontal axis yieldably to press the panel edges together, said arm also being resilient.

15. A vehicle body comprising a hollow body wall, panels independently movable from a concealed position in the body wall to a raised position, positioning and supporting means for said panels, said means including an arm depending from the lower portion of one panel and movable therewith, resilient means associated with the lower end of the arm and tending to swing the panel and arm about a substantially horizontal axis yieldably to press the panel edges together, said arm also being resilient, and means associated with the resilient means to hold the latter under stress even if the panel edges are disengaged.

16. A vehicle body comprising a body wall section, a panel carried thereby, supporting and positioning means for the panel including a guide, a shoe sliding on the guide, a torsion spring projecting from the shoe, a clamp secured to the outer end of the spring, and a leaf spring connecting the clamp and panel.

17. A vehicle body comprising a body wall section, a panel carried thereby, supporting and positioning means for the panel including parallel guides, shoes sliding on the guides, torsion springs projecting toward each other from the shoes, a clamp secured to the outer end of the spring, arms connecting the clamps and panel, and a strut extending between the clamps to hold the shoes in proper engagement with the guides.

Signed by me at Boston, Massachusetts, this 10th day of September, 1931.

RAYMOND L. CARR.